(12) United States Patent
Quandalle et al.

(10) Patent No.: US 11,091,892 B2
(45) Date of Patent: Aug. 17, 2021

(54) SOIL COMPACTION METHOD USING A LASER SCANNER

(71) Applicant: SOLETANCHE FREYSSINET, Rueil Malmaison (FR)

(72) Inventors: Benoit Quandalle, Rueil Malmaison (FR); Simon Bunieski, Rueil Malmaison (FR)

(73) Assignee: SOLETANCHE FREYSSINET, Rueil (FR)

( * ) Notice: Subject to any disclaimer, the term of this patent is extended or adjusted under 35 U.S.C. 154(b) by 0 days.

(21) Appl. No.: 16/954,609

(22) PCT Filed: Dec. 18, 2018

(86) PCT No.: PCT/FR2018/053359
§ 371 (c)(1),
(2) Date: Jun. 17, 2020

(87) PCT Pub. No.: WO2019/122675
PCT Pub. Date: Jun. 27, 2019

(65) Prior Publication Data
US 2020/0308792 A1    Oct. 1, 2020

(30) Foreign Application Priority Data
Dec. 21, 2017  (FR) ..................................... 17 62737

(51) Int. Cl.
*E02D 1/02* (2006.01)
*E02D 3/054* (2006.01)
*G01B 9/02* (2006.01)

(52) U.S. Cl.
CPC .............. *E02D 3/054* (2013.01); *E02D 1/02* (2013.01); *G01B 9/02* (2013.01)

(58) Field of Classification Search
CPC ............ E02D 3/02; E02D 3/046; E02D 3/068
See application file for complete search history.

(56) References Cited

U.S. PATENT DOCUMENTS 4,504,176 A * 3/1985 Lindberg ................ E02D 3/054
173/20
4,580,765 A * 4/1986 Nicholson ............... E02D 3/046
173/87

(Continued)

FOREIGN PATENT DOCUMENTS

CN      201546244 U  *  8/2010
CN      103471541 A     12/2013
(Continued)

OTHER PUBLICATIONS

English language abstract of JP H1161792.
(Continued)

*Primary Examiner* — Benjamin F Fiorello
(74) *Attorney, Agent, or Firm* — Workman Nydegger (57) ABSTRACT

The disclosure relates to a method for compacting a soil, wherein:
a) a ramming cycle is carried out several times on an impact area of the soil during which:
  a mass (16) is dropped on the impact area from a predetermined height (A); and
  after the impact of the mass (16) on the impact area, a point cloud is acquired using a laser scanner in order to obtain a radar image of at least the footprint (E) of the mass in the soil;
b) at least one characteristic data of the soil compaction is determined from at least one of the radar images obtained at the end of the ramming cycles.

17 Claims, 8 Drawing Sheets

(56) References Cited

U.S. PATENT DOCUMENTS

| | | | | |
|---|---|---|---|---|
| 6,460,006 B1* | 10/2002 | Corcoran | ............. | E01C 19/288 404/117 |
| 9,568,407 B2* | 2/2017 | Pittam | .................... | G01N 3/303 |
| 2005/0152750 A1* | 7/2005 | Morizot | .................... | E02D 3/02 405/271 |
| 2011/0254833 A1* | 10/2011 | McDaniel | .............. | G06T 17/05 345/419 |
| 2011/0295552 A1* | 12/2011 | Saarenketo | ............. | G01C 7/04 702/152 |
| 2012/0227475 A1* | 9/2012 | Troxler | .................... | G01N 9/02 73/73 |
| 2012/0304763 A1* | 12/2012 | Troxler | ................. | G01B 11/24 73/32 R |
| 2013/0055797 A1* | 3/2013 | Cline | .................... | G01N 3/303 73/82 |
| 2014/0246635 A1* | 9/2014 | Yi | .......................... | E02D 3/046 254/386 |
| 2014/0368373 A1* | 12/2014 | Crain | .................... | H01Q 1/007 342/5 |
| 2017/0277187 A1* | 9/2017 | Refai | ........................ | G06T 7/30 |
| 2018/0022051 A1* | 1/2018 | Jussel | .................... | E02D 3/046 405/271 |
| 2018/0075643 A1* | 3/2018 | Sequeira | ................. | G01S 17/42 |
| 2018/0179719 A1* | 6/2018 | Wisley | .................... | E02D 1/022 |
| 2020/0236835 A1* | 7/2020 | Stanhope | ........... | A01B 63/1112 |
| 2020/0290846 A1* | 9/2020 | Schull | ...................... | B66D 1/50 |

FOREIGN PATENT DOCUMENTS

| | | |
|---|---|---|
| CN | 107237310 A | 10/2017 |
| FR | 2629846 A1 | 10/1989 |
| JP | H1161792 A | 3/1999 |

OTHER PUBLICATIONS

English language abstract of CN 107237310.
English language abstract of FR 2629846.
English language abstract of CN 103471541.

\* cited by examiner

SOIL COMPACTION METHOD USING A LASER SCANNER

BACKGROUND

The present disclosure relates to the field of soil improvement, and more specifically to the field of soil compaction.

Among the soil compaction methods, the dynamic compaction technique is known, which consists in ramming the soil by making successive high—energy impacts on a predetermined soil portion in order to densify the compressible layers of the soil.

Traditionally, the ramming consists in dropping a compactor mass several times in the same place, generally comprised between 5 and 40 tons, from a height comprised between 5 and 40 meters.

The present disclosure also includes the technique of dynamic replacement, also known as "ballasted studs". This technique differs from the dynamic compaction by the fact that a volume of stones is disposed on the impact area of the mass before certain impacts, in particular before the first impact, during ramming. The impact area may have been excavated beforehand if necessary before the first impact in order to receive all or part of the volume of stones.

Usually, a mesh of impact areas is defined on the soil. On each impact area, a ramming sequence, generally including several ramming cycles, is carried out. Each ramming sequence generally comprises between 2 and 40 ramming cycles.

For years, the monitoring of the effectiveness of the compaction in the course of execution has been mainly based on the evolution of the penetration of the mass in the soil. This penetration can be determined at the end of each ramming cycle by the length of unwinding of the cable at the end of which the mass is attached.

This criterion is however imperfect. For example, in rather fine soils, it is possible to note a significant penetration without improvement of the soil because the soil will simply have been moved upwards on the outskirts of the footprint of the impact.

Another way to attempt to determine an optimal number of impacts is to perform a penetration test at the start of construction. It consists in measuring the volume of depression of the footprint and that of the peripheral lifting, by means of stakes serving as benchmarks and hammered radially along three axes, and by assimilating the footprint and the volume of peripheral lifting to simple geometric shapes.

However, this protocol is slow and inaccurate. Furthermore, it is incompatible with a use at each ramming cycle that is to say at each mass release.

Document FR 2 629 846 proposes to equip the mass with an accelerometer in order to determine characteristic data of the soil.

Such acceleration measurements, in particular at the time of impact, are interesting but alone do not allow correctly characterizing the compaction of the soil.

SUMMARY

An object of the present disclosure is to propose a method for compacting a soil, making it possible to characterize the compaction of the soil more reliably during the implementation of said method.

To do so, the disclosure relates to a method for compacting a soil, in which:

a) a ramming cycle is carried out several times on an impact area of the soil during which:
    a mass is dropped on the impact area from a predetermined height; and
    after the impact of the mass on the impact area, a point cloud is acquired using a laser scanner in order to obtain a radar image of at least the footprint of the mass in the soil;

b) at least one characteristic data of the soil compaction is determined from at least one of the radar images obtained at the end of the ramming cycles.

By footprint is meant the crater or depression formed in the soil after the impact of the mass on the soil.

It is therefore understood that, according to the disclosure, the mass is dropped several times in the same place on the same impact area.

It is understood that the laser scanner scans the impact area, including the footprint and the lifting of the soil around the footprint. The radar image therefore consists of a point cloud.

From the radar image and/or the point cloud, a computer processing, implementing algorithms known otherwise, allows reconstructing the surface of the impact area. It is then possible to compare said surface with the surfaces corresponding to the impacts previously made, or with a reference surface. This reference surface can for example consist of the soil surface before the first ramming cycle of the sequence.

The algorithms also allow calculating the volume of the footprint, as well as the volume of the peripheral lifting, from the radar image.

By characteristic data of the soil compaction is meant data that allow assessing the level of soil compaction, that is to say the increase in soil density. As will be specified below, the characteristic data can be, for example but not exclusively, the depth or the volume of the footprint, the lifting volume around the footprint or mathematical functions combining the aforementioned values.

Thanks to the disclosure, it is then possible to follow the evolution of these parameters during the ramming cycles, which allows assessing "in real time", the level of compaction.

By laser scanner, is meant a device making it possible to carry out a Light Detection And Ranging generally called "LIDAR", known otherwise, and making it possible to reconstruct environments, such as a soil surface, by acquisition of a point cloud.

According to the disclosure, one or several characteristic data can be determined at the end of all the ramming cycles that is to say from all or part of the radar images acquired during the ramming sequence.

According to a preferred embodiment, said at least one characteristic data of the soil compaction is determined at the end of each ramming cycle. This allows the operator to know the value of the characteristic data of the soil compaction at each cycle of the ramming sequence.

This information can lead it to modify the impact energy, for example by modifying the predetermined height, or even end the ramming sequence. In other words, the disclosure makes it possible to effectively assist the operator in controlling the ramming machine.

Advantageously, the evolution of said at least one characteristic data of the soil compaction is determined during the ramming cycles.

One advantage is to allow the operator to follow the evolution of the characteristic data at each cycle. He can thus decide to stop the sequence, or continue it, depending on the characteristic data or depending on its evolution, embodied by a curve which can be displayed on a screen made available to the operator.

Advantageously, said at least one characteristic data of the soil compaction is a depth of the footprint.

This depth is calculated using the mathematical processing of the radar image of the impact area. Preferably, the calculated depth may be the maximum depth of the footprint.

Advantageously, said at least one characteristic data of the soil compaction is a volume of lifting of the soil around the footprint.

Again, the volume of soil lifting around the footprint is determined by calculation from the radar image of the impact area. The lifting volume is preferably calculated from the soil surface reconstituted from a point cloud derived from the radar image. More preferably, but not exclusively, the lifting volume is calculated by comparing the surface of the impact area relative to the reference surface. As mentioned above, this reference surface is for example obtained from a radar image of the soil acquired before the first impact on the soil.

It should be specified that the lifting volume can be a negative value. In this case, it is a subsidence volume.

Advantageously, said at least one characteristic data of the soil compaction is a volume of the footprint.

Similarly, the volume of the footprint is determined by calculation from the radar image of the impact area. The volume of the footprint is preferably calculated from the surface of the soil reconstituted from a point cloud derived from the radar image. More preferably, but not exclusively, the volume of the footprint is calculated by comparison with the aforementioned reference surface.

Without departing from the scope of the present disclosure, at the end of each cycle, two or three characteristic data are determined, taken for example from the depth of the footprint, the volume of the footprint, and the lifting volume.

Advantageously, the repetition of the ramming cycles is stopped when said at least one characteristic data of the soil compaction has reached a predetermined threshold.

Alternatively, the sequence can be stopped if this predetermined threshold is exceeded or undershot.

The predetermined threshold may be determined, before the beginning of the ramming sequence, from the characteristics of the soil that it is desired to obtain at the end of the compaction operations.

According to a preferred mode of implementation, a first characteristic data of the soil compaction and a second characteristic data of the soil compaction are determined at the end of each ramming cycle.

Without departing from the scope of the present disclosure, and as explained above, a number of characteristic data of the soil compaction greater than two can be determined at the end of each ramming cycle.

In particular, but not exclusively, the first and second characteristic data can be taken from the data mentioned above, namely the depth of the footprint, the volume of the footprint, or even the lifting volume.

Advantageously, a characteristic value of the soil compaction is determined from the first and second characteristic data of the soil compaction.

This characteristic value of the soil compaction is a mathematical function of the first and second characteristic data of the soil compaction.

Without departing from the scope of the present disclosure, several characteristic values of soil compaction could be determined at the end of each cycle, from the same characteristic data as the first and second data mentioned above or other characteristic data.

An advantage of calculating a characteristic value from the combination of several characteristic data is to be able to quantify the soil compaction more specifically.

Advantageously, the evolution, during the ramming cycles, of the characteristic value of the soil compaction is determined.

An advantage is to be able to follow the evolution of the characteristic value of the soil compaction, and to modify if necessary the course of the ramming sequence.

Advantageously, the repetition of the ramming cycles is stopped when the characteristic value of the soil compaction has reached a predetermined compaction threshold.

Like the aforementioned threshold, the predetermined compaction threshold can be determined, before the start of the ramming sequence, for example as a function of the density of the soil desired to be obtained at the end of the ramming sequences.

According to a preferred, but not exclusive, mode of implementation, the characteristic value of the soil compaction is the difference between the first characteristic data of the soil compaction and the second characteristic data of the soil compaction.

Without departing from the scope of the present disclosure, other combinations or mathematical functions can be chosen to determine the characteristic value of the soil compaction.

According to a preferred mode of implementation, the first characteristic data of the soil compaction is the volume of the footprint, while the second characteristic data of the soil compaction is the volume of lifting of the soil around the footprint.

The difference between the volume of the footprint and the lifting volume is called effective volume.

The monitoring of the evolution of the effective volume makes it possible to quantify the level of soil compaction in a relatively accurate manner.

Advantageously, the evolution of the effective volume is followed during the ramming cycles, and the sequence is stopped when the effective volume has reached a predetermined compaction threshold.

This predetermined compaction threshold may be the threshold for which the slope of the curve embodying the evolution of the characteristic value is equal to a predetermined coefficient. One advantage is to be able to stop the ramming sequence when the characteristic value has reached a plateau.

Thanks to the disclosure, the necessary and sufficient number of ramming cycles are carried out, which makes it possible to improve the rate of execution of the compaction operations and to reduce their costs.

In addition, in the presence of a heterogeneous soil, the disclosure makes it possible to carry out numbers of ramming cycles which may be different from one impact area to another. An advantage is to adapt to the structure of a heterogeneous ground to be densified, which makes it possible to globally optimize the compaction operations.

Advantageously, the predetermined height is determined from said at least one characteristic data of the soil compaction.

It is therefore understood that the method according to the disclosure makes it possible to adjust the impact energy during the ramming sequence to adapt to the structure of the soil to be compacted.

Preferably, during step a), the acquisition of the radar image is carried out during the raising of the mass or when the mass has reached the predetermined height.

This takes advantage of the time taken for the mass to be raised to carry out the image acquisition, and also preferably to determine said at least one characteristic data. This process in masked time has the advantageous effect of not extending the duration of the ramming sequences.

Preferably, the acquisition of the radar image is carried out when it has been detected that the mass leaves the field of view of the laser scanner.

Advantageously, the radar image is a three-dimensional radar image. One advantage is to be able to more easily determine the volume of the footprint and/or the lifting volume.

According to one variant of implementation, stones are placed on the soil before starting the ramming cycle, which allows making ballasted studs in the soil.

The present disclosure also relates to a machine for the implementation of the method according to the disclosure, said machine including a mast, a mass suspended from the mast, a device for raising the mass after the impact of the mass on a soil impact area, and a laser scanner configured to acquire a point cloud in order to obtain a radar image of at least the impact area.

It is understood that the impact area includes the footprint and the lifting of the soil around the footprint. The soil lifting and the footprint can be defined relative to a reference surface, for example corresponding to the soil surface before the first impact.

The machine may also comprise a carrier, of the track type, in order to move the mass.

The device for raising the mass preferably includes a cable, attached to the mass, and actuated by a reel disposed on the machine.

According to the disclosure, the mass can be released with or without being attached to the cable. In the case where the mass is released while remaining attached to the cable, it is understood that enough slack is provided to prevent the tension of the cable from slowing down the fall of the mass.

According to a first embodiment, the laser scanner is mounted on the mast.

Also, thanks to the disclosure, the laser scanner can be easily mounted on any type of hoisting machine.

The laser scanner being disposed at an elevated position on the mast, it can take a top image of the impact area, which makes it possible to determine more accurately the volume of the footprint and the lifting volume.

Preferably, but not exclusively, the laser scanner is a 2D scanner pivotally mounted relative to the mast along a horizontal axis of rotation.

The pivoting about the horizontal axis of rotation allows scanning in an additional dimension, whereby a three-dimensional image is obtained.

According to another embodiment, the machine according to the disclosure further includes a drone equipped with the laser scanner.

One advantage of using a drone is to implement more quickly the method according to the disclosure, avoiding the step of mounting the laser scanner to the mast.

Without departing from the scope of the present disclosure, the laser scanner could be a 3D laser.

BRIEF DESCRIPTION OF THE DRAWINGS

The disclosure will be better understood upon reading the following description of one embodiment of the disclosure given by way of non-limiting example, with reference to the appended drawings, in which.

DETAILED DESCRIPTION

FIGS. 1 to 4 illustrate a machine 10 for the implementation of a soil compaction method 9, according to the present disclosure. This machine 10 includes a tracked carrier 12 provided with a mast 14. The machine 10 also includes a mass 16 whose upper face 16a is attached to the end of at least one cable 18. As schematized in FIG. 1, the cable 18 passes through the arrow 14a of the mast 14. A tensile force can be exerted on the cable 18 using the hoisting device 20 disposed on the carrier 12.

In this non-limiting example, the mass weighs approximately 25 tons, and the machine 10 is configured to bring the mass to a predetermined height A comprised between 5 and 30 meters. The machine 10 is configured to drop the mass 16 on the soil 9. To do so, the tension exerted on the cable 18 is released, which causes the fall of the mass 16 on the soil from the predetermined height A. The cable released follows the mass 16 in its fall without however slowing it down.

Figure 1:
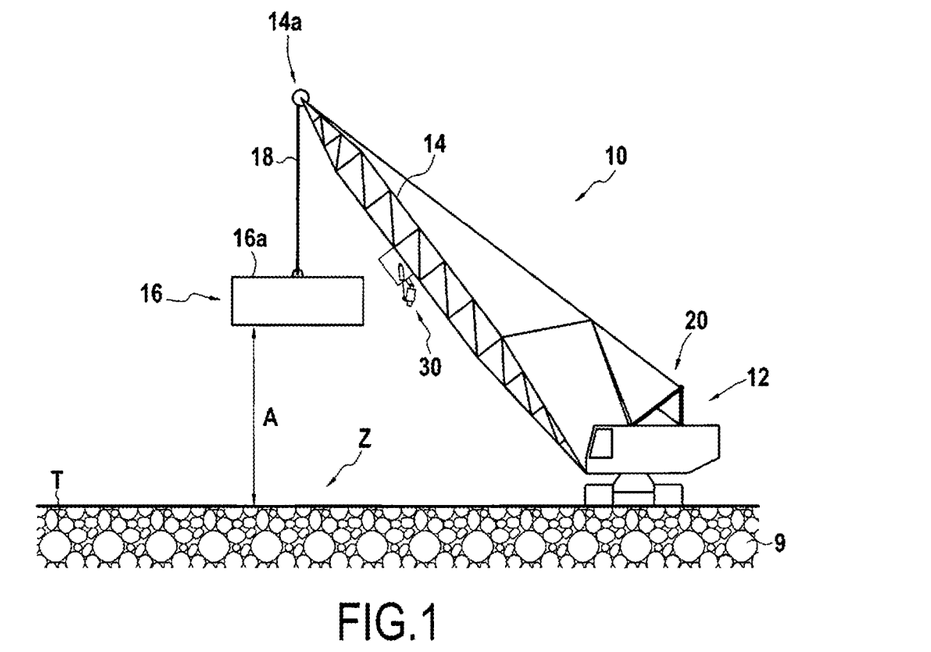
FIG. 1 illustrates the compaction method according to the disclosure, the mass being in the raised position.

FIG. 1 illustrates the soil 9 before compaction, its surface T being substantially horizontal. This surface T constitutes a reference surface.

FIGS. 1 to 4 illustrate a ramming cycle of a ramming sequence during which the mass 16 is first dropped on an area of the soil, called impact area Z, from the predetermined height A. It is understood that the mass 16 is released several times from a predetermined position in order to ram the impact area Z several times.

Figure 2:
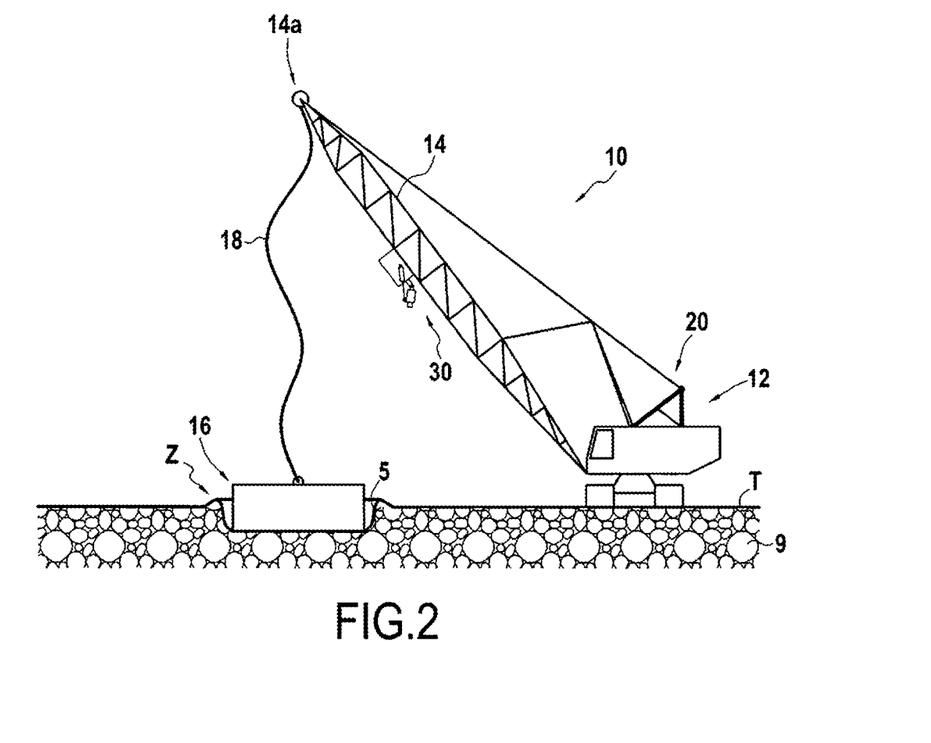
FIG. 2 illustrates the first impact in the soil and the formation of a footprint in the soil.

The impact of the mass 16 on the soil impact area 9 has the effect of forming a crater or a footprint E in the soil 9 and, most often, a lifting area S located around the footprint E. It should be noted that the outskirts of the footprint may also have subsidence areas.

Figure 3:
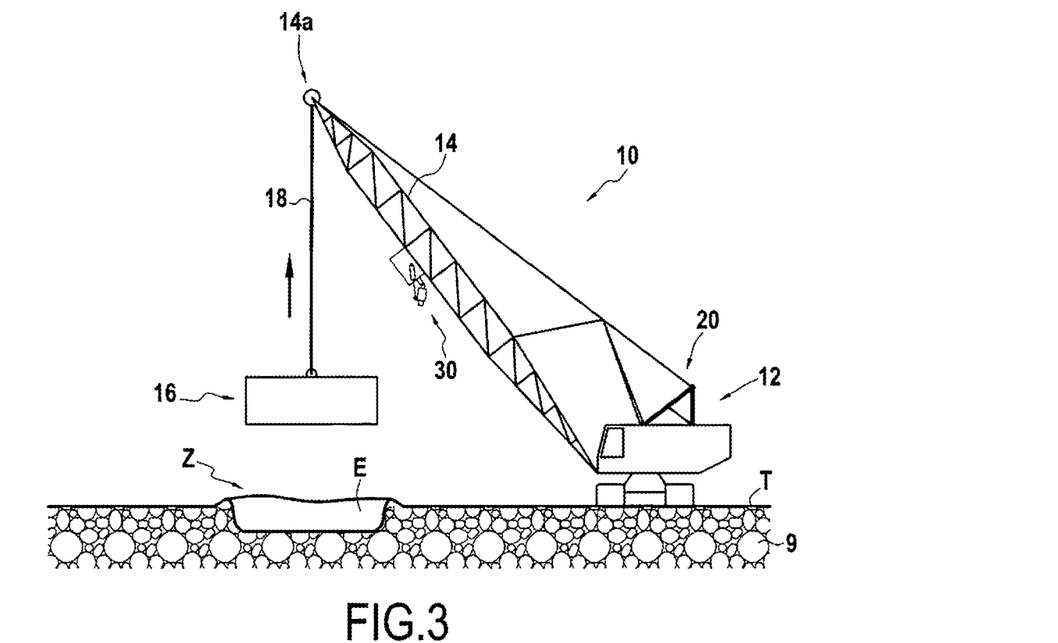
FIG. 3 illustrates the raising of the mass.

As illustrated in FIG. 3, after the impact of the mass 16 on the soil 9, the mass 16 is raised by actuating the hoisting device 20, which causes traction on the cable 18. The mass 16 is therefore brought back towards its predetermined height A.

Figure 4:
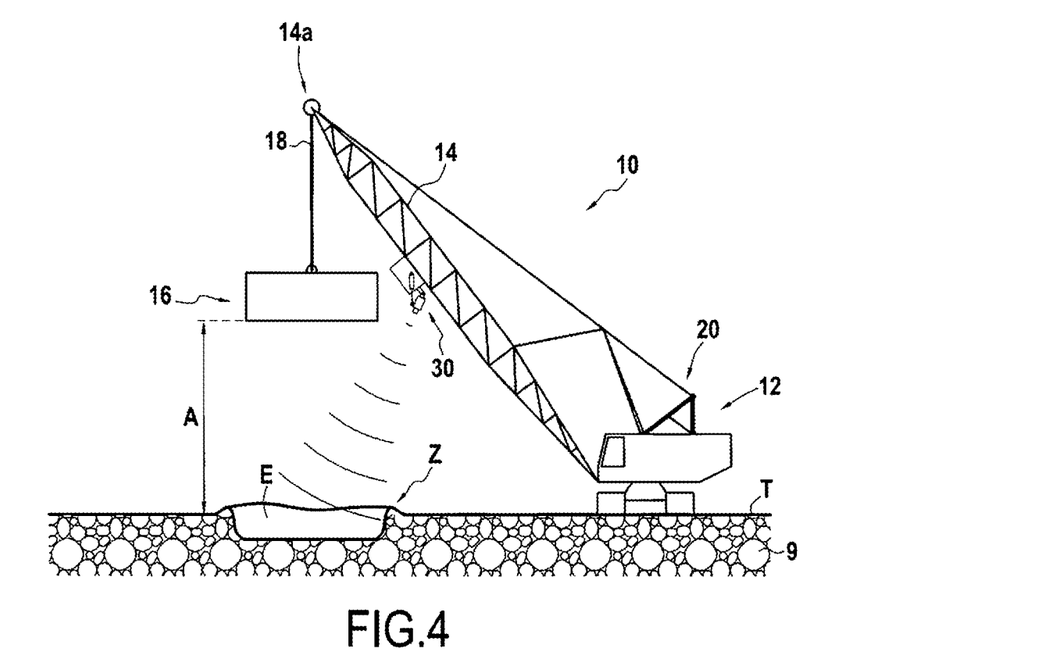
FIG. 4 illustrates the acquisition of the radar image of the footprint of the mass in the soil, FIGS. 5A to 5C schematize the evolution of the impact area after two ramming cycles.

According to the disclosure, after the impact of the mass 16 on the soil 9, a point cloud is acquired using a laser scanner 30 in order to obtain a radar image of at least the footprint E of the mass in the soil. In this non-limiting example, the laser scanner 30 is mounted on the mast 14. In this example, the radar image is acquired during the raising of the mass 16 and more specifically after the mass 16 has left the field of view of the laser scanner 30.

After the mass 16 has returned to its predetermined height A, a second ramming cycle identical to the one just described is carried out. The same impact area (Z) mentioned above is therefore rammed again.

All the ramming cycles carried out on the same impact area Z constitute a ramming sequence. After the ramming sequence, the operator moves the machine 10 in order to bring the mass 16 in line with another impact area in order to carry out the following ramming sequence, and so on.

Figure 10A:
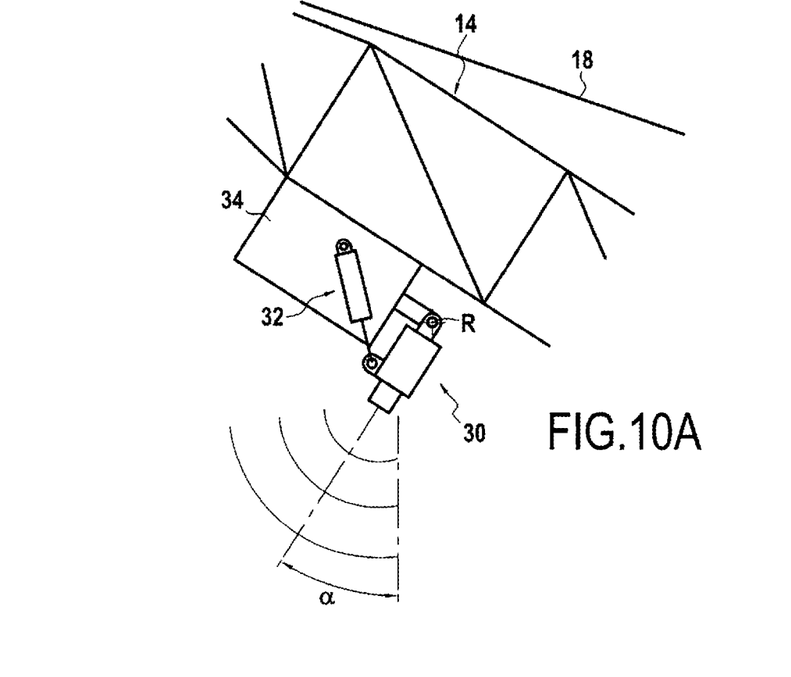
FIGS. 10A and 10B illustrate a first embodiment of the compacting machine according to the disclosure in which the laser scanner is mounted on the mast of the machine.
Figure 10B:
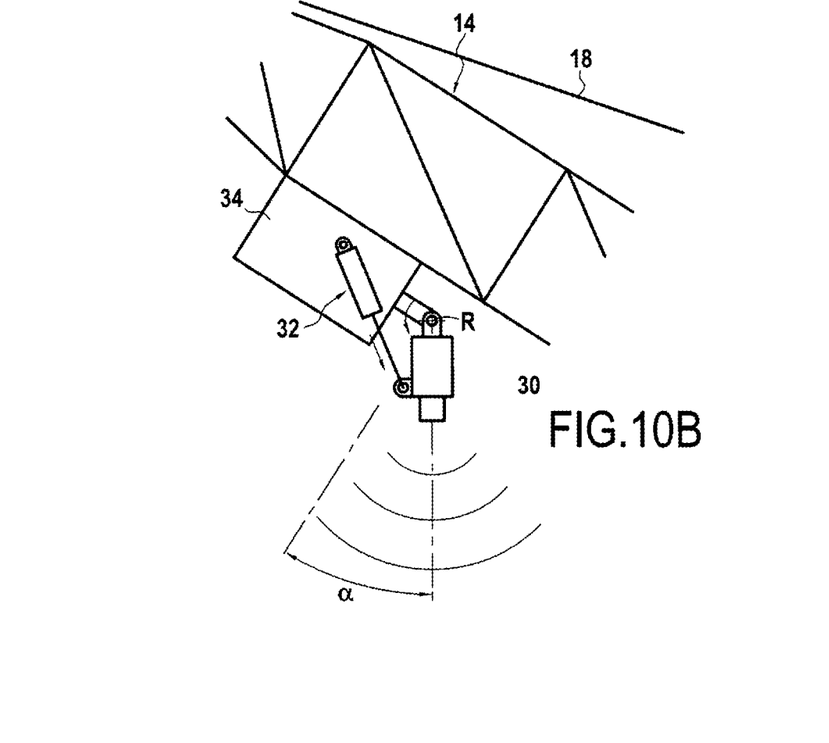

As can be seen in FIGS. 10A and 10B, the laser scanner 30 is rotatably mounted on the mast 14 about an axis of rotation R which, in this example, is substantially horizontal. The laser scanner 30 is pivoted about the axis of rotation R by means of a jack 32 fixed to the mast 14, on the one hand, and to the laser scanner 30, on the other hand.

The actuation of the jack 32 has the effect of pivoting the laser scanner 30 over an amplitude α, on the order of 70 degrees.

In this example, the laser scanner is a two-dimensional LIDAR type scanner. The pivoting of the laser scanner 30 about the axis of rotation R makes it possible to carry out a scanning in a vertical plane, whereby a three-dimensional radar image is acquired.

According to the disclosure, at least one characteristic data of the compaction of the soil 9 is determined from at least one of the radar images obtained at the end of the ramming cycles.

In this example, a first characteristic data of the soil compaction and a second characteristic data of the soil compaction are determined at the end of each ramming cycle.

Without departing from the scope of the present disclosure, a single characteristic data of the soil compaction could be determined at the end of each ramming cycle.

In this example, the first characteristic data of the soil compaction is the volume of the footprint VE, while the second characteristic of the soil compaction is the lifting volume VS.

FIGS. 5A, 5B, 5C and 6 will help describing in more detail these first and second characteristic data of the soil compaction which are determined using radar images obtained by the laser scanner 30.

Figure 5A:
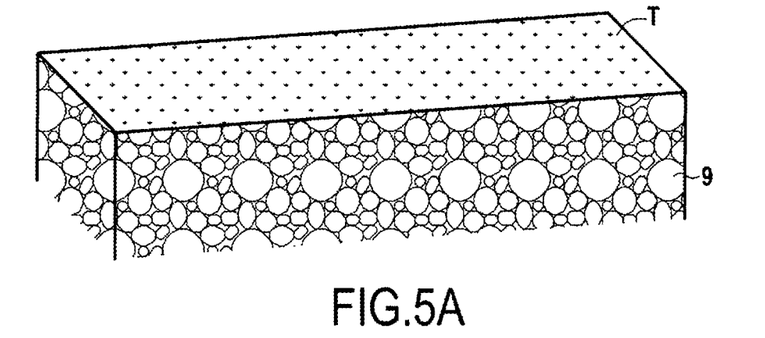

FIG. 5A represents the condition of the soil before the ramming operations. The reference T illustrates the reference surface.

Figure 5B:
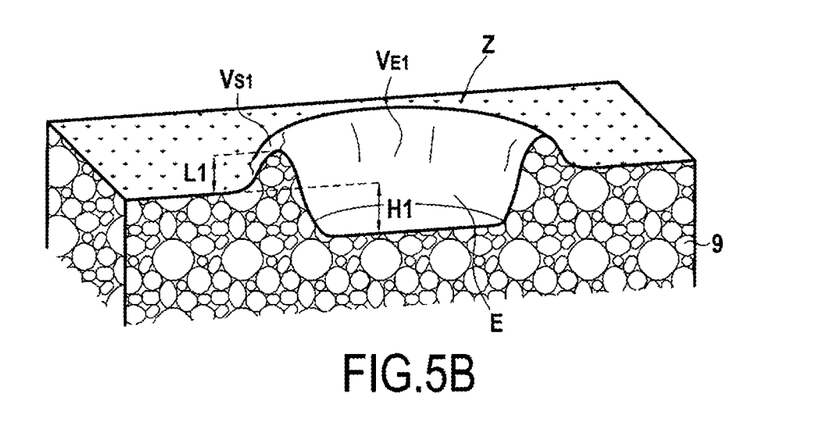

FIG. 5B illustrates the impact area at the end of the first ramming cycle, which is also illustrated in FIG. 3.

Figure 5C:
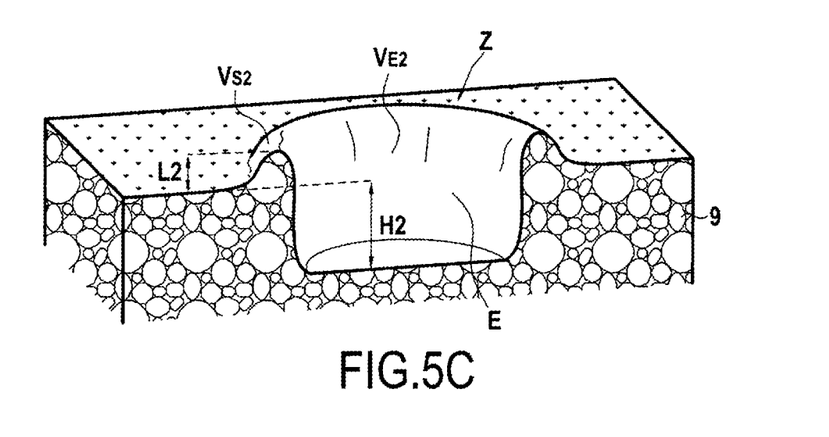

FIG. 5 represents for its part the impact area at the end of the second ramming cycle.

In FIG. 5B, the references VE1, H1, VS1, L1 respectively represent the volume of the footprint, the depth of the footprint, the lifting volume and the lifting height at the end of the first ramming cycle.

The references VE2, VS2, H2, L2 respectively represent the volume of the footprint, the lifting volume, the depth of the footprint E and the lifting height at the end of the second ramming cycle.

Figure 6:
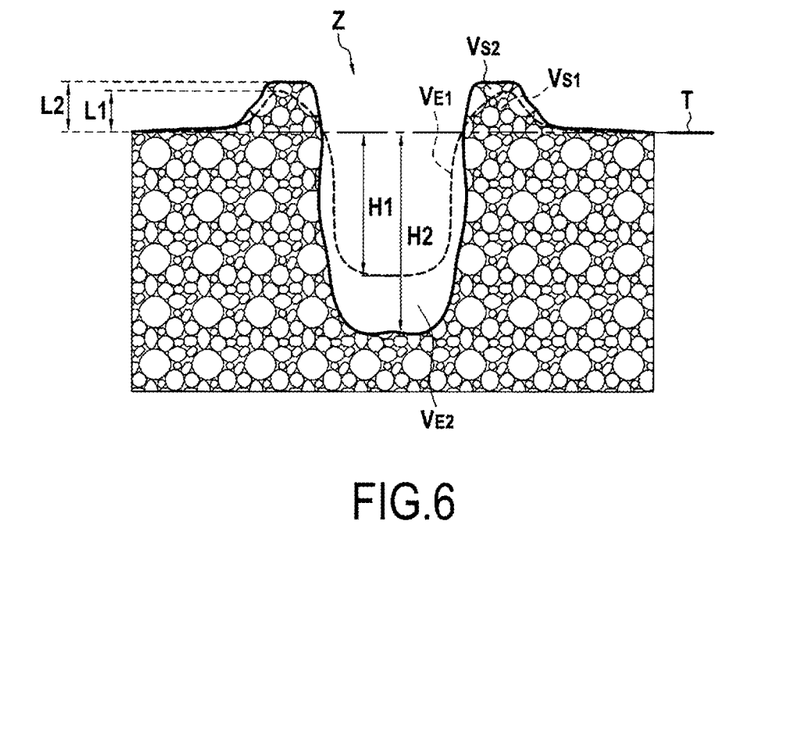
FIG. 6 is a sectional view of the impact area, taken in a vertical plane.

The evolution during the first and second ramming cycles of these different values is schematized in FIG. 6 which illustrates the profile of the footprint in cross section in a vertical plane.

Figure 7:
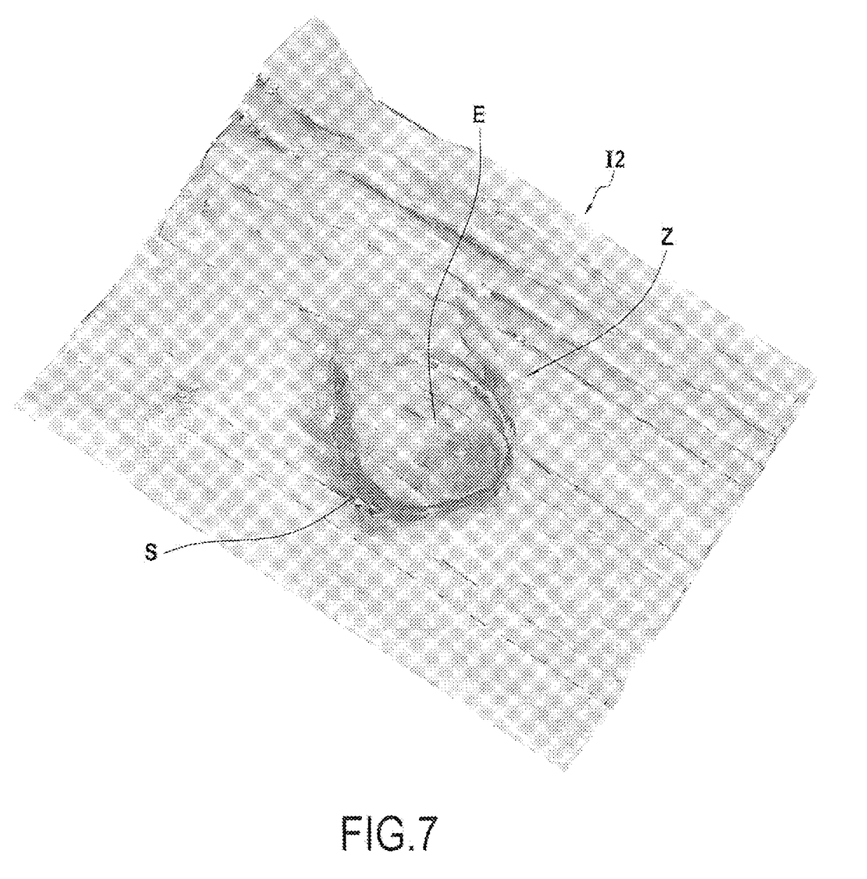
FIG. 7 is an example of a surface generated from a radar image acquired at the end of a ramming cycle.

FIG. 7 illustrates a radar image 12 obtained at the end of the second ramming cycle.

Figure 8:
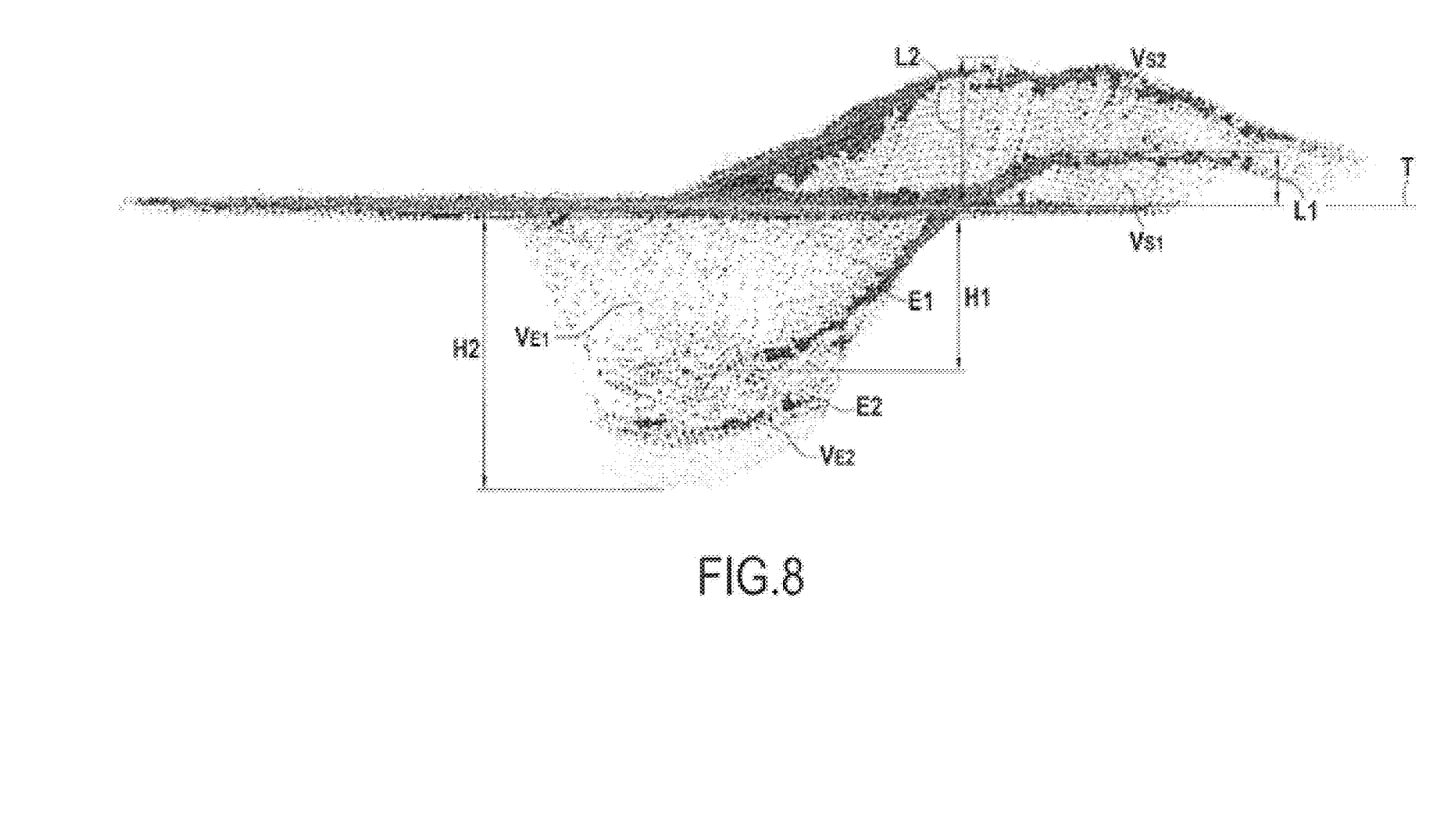
FIG. 8 is an example of point clouds derived from a radar image.

FIG. 8 illustrates a point cloud coming from the radar images obtained at the end of the first and second ramming cycles. This point cloud then makes it possible, using algorithms known otherwise, to determine the volume VE1 of the footprint E, the depth H1 of the footprint E, the lifting volume VS1 and the lifting height L1 at the end of the first ramming cycle, as well as the volume VE2 of the footprint E, the depth H2 of the footprint E, the lifting volume VS2 and the lifting height L2 at the end of the second ramming cycle.

Obviously, the same principle applies to carry out a mathematical processing for ramming sequences including a greater number of ramming cycles.

According to the disclosure, the evolution of the characteristic data of the soil compaction is determined and followed during the ramming cycles.

In this example, there will be more particularly an interest in the evolution during the ramming cycles of the first and second characteristic data of the soil compaction, constituted respectively by the volume of the footprint VE and the lifting volume VS. The evolution of these first and second characteristic data is illustrated on the curve in FIG. 9, where N corresponds to the number of cycles.

Figure 9:
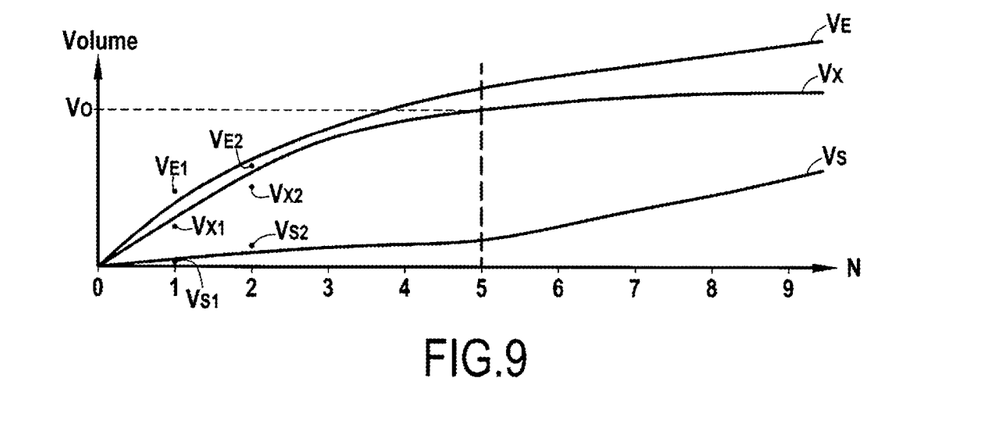
FIG. 9 is a curve showing the evolution of the volume of the footprint, of the lifting volume and of the effective volume during the ramming cycles.

In the mode of implementation described here, a characteristic value of the soil compaction VX is further determined from the first characteristic data of the soil compaction VE, VS. In this example, the characteristic value of the soil compaction VX is determined from the difference between the first and second characteristic data of the soil compaction, that is to say from the difference between the volume of the footprint VE and the lifting volume VS of the soil around the footprint E.

There is therefore:

$$VX=VE-VS.$$

This characteristic value of the compaction of the soil VX is called effective volume.

According to the disclosure, the evolution of the characteristic value of the soil compaction VX during the ramming cycles is determined and followed.

FIG. 9 also illustrates the evolution of the effective volume VX during the N ramming cycles.

In this example, the repetition of the ramming cycles is stopped when their characteristic of the soil compaction VX has reached a predetermined compaction threshold $V_0$. In this example, the compaction threshold is therefore a volume.

Without departing from the scope of the present disclosure, the predetermined compaction threshold could be a constant, the ramming sequence being stopped when the slope of the curve of the effective volume VX is less than said constant.

Indeed, it is observed that from a certain number of cycles, the curve of the effective volume presents a plateau which reflects the fact that the density of the soil hardly increases at all despite the continuation of the ramming cycles.

In other words, the ramming cycles are stopped when the effective volume VX has reached this plateau. In this non-limiting example, the stopping of the ramming sequence at the end of the fifth ramming cycle have been schematized. Obviously, the number of ramming cycles will depend on some parameters such as the nature of the ground to be compacted, the mass 16, the predetermined height A, etc.

Figure 11:
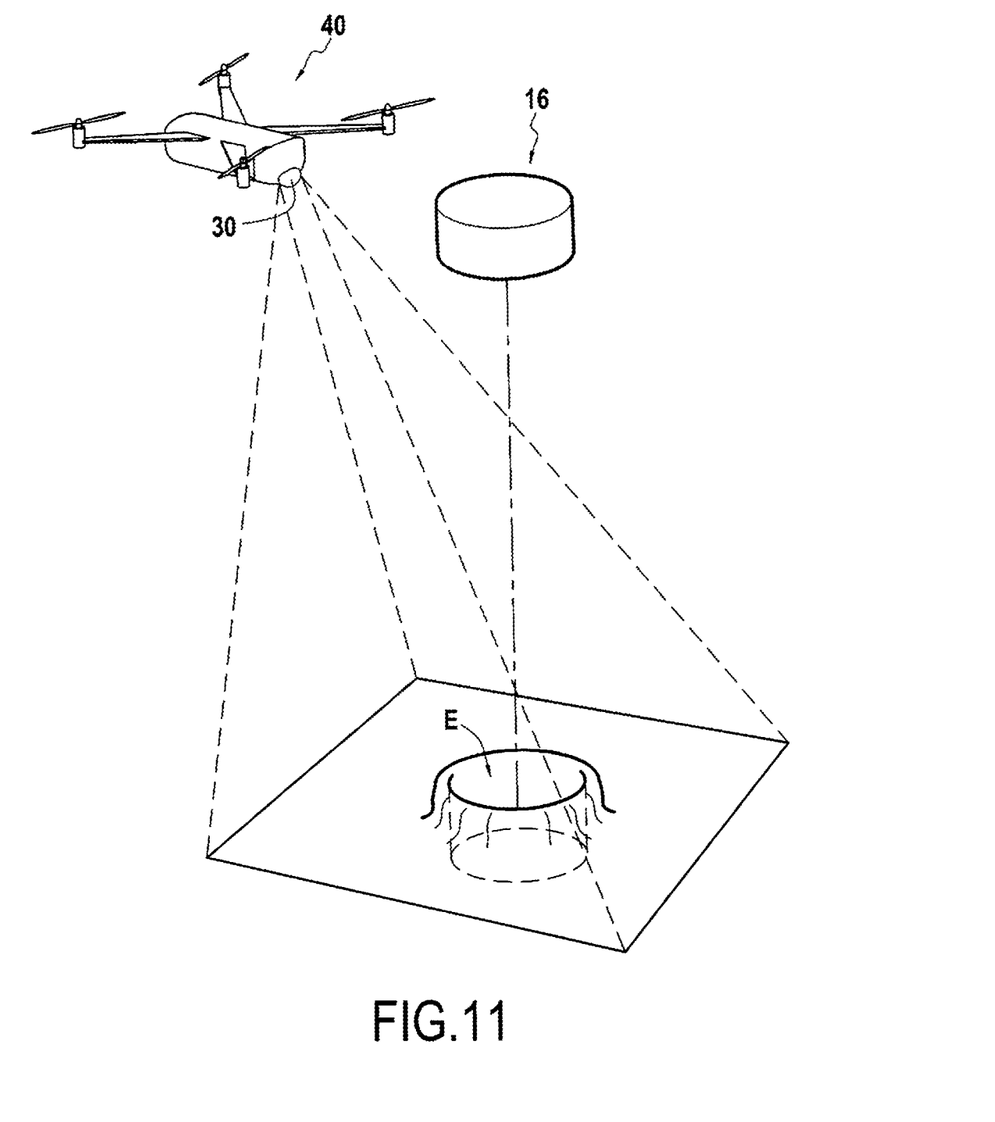
FIG. 11 illustrates a second embodiment of the compacting machine according to the disclosure in which the laser scanner is mounted on a drone.

FIG. 11 illustrates a second embodiment of the disclosure in which the laser scanner 30 is mounted on a drone 40.

The drone 40 is also equipped with a device for transmitting the radar images, taken at the end of each cycle, to a computing unit (not illustrated here).

The invention claimed is:

1. A method for compacting a soil, wherein:
   a) a ramming cycle is carried out several times on an impact area of the soil during which:
      a mass is dropped on the impact area from a predetermined height; and
      after the impact of the mass on the impact area, a point cloud is acquired using a laser scanner in order to obtain a radar image of at least a footprint of the mass in the soil and a lifting of the soil around the footprint;
   b) at least one of the volume of the footprint and the volume of the lifting of the soil around the footprint is determined from at least one of the radar images obtained at the end of the ramming cycles, wherein the repetition of the ramming cycles is stopped when the volume of the footprint or the volume of the lifting of the soil around the footprint has reached a predetermined threshold.

2. The method according to claim 1, wherein at least one of the volume of the footprint and the volume of the lifting of the soil around the footprint is determined at the end of each ramming cycle.

3. The method according to claim 2, wherein the evolution of at least one of the volume of the footprint and the volume of the lifting of the soil around the footprint is determined during the ramming cycles.

4. The method according to claim 1, wherein the volume of the footprint and the volume of the lifting of the soil around the footprint are determined at the end of each ramming cycle.

5. The method according to claim 4, wherein an effective volume is determined from the difference between the volume of the footprint and the volume of the lifting of the soil around the footprint.

6. The method according to claim 5, wherein the evolution, during the ramming cycles, of the effective volume is determined.

7. The method according to claim 5, wherein the repetition of the ramming cycles is stopped when the effective volume has reached a predetermined compaction threshold.

8. The method according to claim 1, wherein the predetermined height is determined from the volume of the footprint or from the volume of the lifting of the soil around the footprint.

9. The method according to claim 1, wherein, during step a), the acquisition of the radar image is carried out during the raising of the mass or when the mass has reached the predetermined height.

10. The method according to claim 1, wherein the radar image is a three-dimensional radar image.

11. A machine for the implementation of the method for compacting a soil according to claim 1, wherein said machine includes a mast, a mass suspended from the mast, a device for raising the mass after the impact of the mass on a soil impact area, and a laser scanner configured to acquire a point cloud in order to obtain a radar image of at least the impact area, wherein the laser scanner is mounted on the mast and comprises a 2D scanner pivotally mounted relative to the mast along a horizontal axis of rotation.

12. The machine according to claim 11, further including a drone equipped with the laser scanner.

13. A method for compacting a soil, wherein:
   a ramming cycle is carried out several times on an impact area of the soil during which:
      a mass is dropped on the impact area from a predetermined height; and
      after the impact of the mass on the impact area, a point cloud is acquired using a laser scanner in order to obtain a radar image of at least a footprint of the mass in the soil,
   the depth of the footprint is determined from the radar image;
   the predetermined height for the next mass drop is determined from the depth of the footprint.

14. A method for compacting a soil, wherein:
   a) a ramming cycle is carried out several times on an impact area of the soil during which:
      a mass is dropped on the impact area from a predetermined height; and
      after the impact of the mass on the impact area, a point cloud is acquired using a laser scanner in order to obtain a radar image of at least a footprint of the mass in the soil and a lifting of the soil around the footprint;
   b) the volume of the footprint and the volume of the lifting of the soil around the footprint are determined from at least one of the radar images obtained at the end of the ramming cycles,
   wherein an effective volume is determined from the difference between the volume of the footprint and the volume of the lifting of the soil around the footprint, and wherein the repetition of the ramming cycles is stopped when the effective volume has reached a predetermined compaction threshold.

15. The method according to claim 14, wherein the predetermined height is determined from the volume of the footprint or from the volume of the lifting of the soil around the footprint.

16. The method according to claim 14, wherein, during step a), the acquisition of the radar image is carried out during the raising of the mass or when the mass has reached the predetermined height.

17. The method according to claim 14, wherein the radar image is a three-dimensional radar image.

* * * * *